(12) United States Patent
Favor

(10) Patent No.: US 6,970,998 B1
(45) Date of Patent: Nov. 29, 2005

(54) DECODING SUFFIX INSTRUCTION SPECIFYING REPLACEMENT DESTINATION FOR PRIMARY INSTRUCTION

(75) Inventor: John G. Favor, Scotts Valley, CA (US)

(73) Assignee: Redback Networks Inc., San Jose, CA (US)

( * ) Notice: Subject to any disclaimer, the term of this patent is extended or adjusted under 35 U.S.C. 154(b) by 418 days.

(21) Appl. No.: 10/266,116

(22) Filed: Oct. 7, 2002

Related U.S. Application Data

(60) Provisional application No. 60/359,099, filed on Feb. 22, 2002.

(51) Int. Cl.[7] .................................................. G06F 9/34
(52) U.S. Cl. ....................................... 712/226; 712/212
(58) Field of Search ................................. 712/200, 212, 712/226

(56) References Cited

U.S. PATENT DOCUMENTS

| | | | |
|---|---|---|---|
| 4,306,285 A * | 12/1981 | Moriya et al. ............... | 712/226 |
| 5,303,358 A | 4/1994 | Baum ........................... | 712/226 |
| 5,423,012 A | 6/1995 | Sato et al. .................... | 712/204 |
| 5,613,143 A | 3/1997 | Shimokawa ................... | 712/42 |
| 5,625,784 A | 4/1997 | Purcell ......................... | 712/210 |
| 5,634,118 A * | 5/1997 | Blomgren .................... | 712/226 |
| 6,014,736 A * | 1/2000 | Elliott et al. ................. | 712/216 |
| 6,308,258 B1 | 10/2001 | Kubota et al. ............... | 712/210 |

* cited by examiner

*Primary Examiner*—Kenneth S. Kim
(74) *Attorney, Agent, or Firm*—Blakely, Sokoloff, Taylor & Zafman LLP

(57) ABSTRACT

In an embodiment, a method comprises receiving a first instruction and a second instruction, where the second instruction specifies that a destination address of the first instruction should be replaced with a destination address of the second instruction. The method also includes decoding the first instruction and the second instruction. The decoding comprises replacing a destination address of the first instruction with an address provided by the second instruction, upon determining that the second instruction is a suffix instructions to the first instruction.

27 Claims, 5 Drawing Sheets

DECODING SUFFIX INSTRUCTION SPECIFYING REPLACEMENT DESTINATION FOR PRIMARY INSTRUCTION

CROSS REFERENCE TO RELATED APPLICATION

This application claims the benefit of U.S. provisional patent application No. 60/359,099 entitled "Processing Instructions Having Associated Suffix Instructions," filed Feb. 22, 2002.

FIELD OF THE INVENTION

The invention relates to computer processing. More specifically, the invention relates to processing instructions having associated suffixes.

BACKGROUND OF THE INVENTION

The designs of processors continue to increase the speed at which applications are executed therein. Moreover, certain processors, such as RISC (Reduced Instruction Set Computer)-based processors, include a reduced set of instructions that enable these processors to execute faster in comparison to processors with a more complex instruction set and having a greater number of instructions, such as CISC (Complex Instruction Set Computer)-based processors.

Typically, these processors having a reduced instruction set are, therefore, limited in the number as well as size of instructions. In particular, the size of the instructions is such that a limited number of operands can be included within the instruction. For example, such instructions may be limited to a two operand format, wherein the two operands within the instruction are the two source operands and wherein one of these source operands also serves as the destination register for the results of the execution. However, in certain instances, it may be advantageous to have the destination register that is different from one of the source registers. In particular, if the value of the source operand stored in the source register (that is to be employed as the destination register) will be used in future instructions, this value of the source operand should be preserved, rather than being overwritten. If overwritten by the destination result, this value will again need to be retrieved and stored in one of the registers. This can lead to pipeline stalls and other delays in the execution of the instructions. Therefore, a number of approaches have been developed in order to allow for a destination register that is different from one of the source registers.

One technique was to include multiple instructions to achieve a result wherein the destination register was different from one of the source registers. Specifically, a first instruction would perform the given operation, such as an addition operation, which was followed by a second instruction that would comprise a move operation (the result was moved from one of the source registers to a different register). Accordingly, the move operation is executed to copy the source register to a different register. Therefore, the original source register or the source register to which the value was copied can be employed as the destination of a subsequent instruction. However as described, this approach requires additional instruction execution, thereby slowing down execution of the application that includes such instructions.

Another typical approach to allow for a destination register that was different from one of the source registers in an instruction is to define a larger instruction format. In particular, the larger instruction format would increase the size of the instruction to allow for the specifying of three operands (e.g., a 32-bit format). However, such an approach would increase the code density as well as the instruction fetch bandwidth for such instructions.

Another conventional approach to allow for a destination register that was different from one of the source registers in an instruction is to include a prefix instruction that designates a different destination register for the subsequent instruction. In particular, the prefix instruction is not an instruction that is executed, but rather serves to inform the decoder and execution unit (within the processor) that the result is to be stored in destination register that is different from one of the source operands. Disadvantageously, this approach also slows down execution of the instruction and therefore the execution of the application that includes such an instruction. In particular, this prefix instruction is executed within the critical timing path of the processor (as the prefix instruction is processed prior to processing the actual instruction).

To help illustrate, such an approach can include a number of instruction registers coupled to a multiplexer. Similarly, the register file (that comprises a number of data registers) is coupled to a multiplexer. In operation, when the decode logic determines that the instruction serves as a prefix to the subsequent instruction, the decode logic controls the multiplexer such that the addresses of the instruction from the second instruction register are transmitted to the register file, while the operational code of the instruction from the second instruction register is transmitted to the decode logic. Conversely, when the decode logic determines that the instruction is not a prefix to the subsequent instruction, the decode logic controls the multiplexer such that the addresses of the instruction from the first instruction register are transmitted to the register file, while the operational code of the instruction from the first instruction register is transmitted to the decode logic. Accordingly, a number of gate delays are introduced into the critical timing path of the processor in order to accommodate a prefix instruction, thereby slowing down the execution speed of the processor when processing such instructions.

SUMMARY

A method, apparatus and system for processing instructions having associated suffixes are described. In an embodiment, a method comprises receiving a first instruction and a second instruction. The method also includes decoding the first instruction and the second instruction. The decoding comprises replacing a destination address of the first instruction with an address provided by the second instruction, upon determining that the second instruction is a suffix instruction to the first instruction.

In an embodiment, an apparatus comprises a decoder coupled to an instruction buffer. The instruction buffer comprises a first instruction register and a second instruction register. The first instruction register is to store a first instruction, and the second instruction register is to store a second instruction. The decoder is to decode the first instruction. The apparatus also comprises a suffix decoder coupled to the instruction buffer. The suffix decoder is to decode the second instruction. The decoding by the suffix decoder includes replacing a destination address of the first instruction with an address stored in the second instruction, upon determining that the second instruction is a suffix instruction to the first instruction.

In one embodiment, a machine-readable medium, having program code for execution by a processor, comprises a first instruction comprising an operational code, a first operand and a second operand. One of the first operand and second operand is a destination location for a result of the execution by the processor of the first instruction. The machine-readable medium also includes a second instruction, wherein the second instruction is a suffix instruction to the first instruction. The suffix instruction has a new destination location for the result of the execution by the processor of the first instruction.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, processor 100 can be located in FIG. 1. However, element numbers are the same for those elements that are the same across different Figures.

In the drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. Embodiments of the present invention are portable to different operating systems, hardware architectures, instruction sets, parallel programming paradigms, programming languages, compilers, linkers, run time environments and multi-threading environments. Further, while embodiments of the invention are described such that suffixes to instructions are termed instructions themselves, in an embodiment, the suffixes are not an instruction to be executed independent of other instructions. In other words, in one embodiment, the suffixes are part of the prior instruction.

In an embodiment, the suffix instruction includes a different destination address for storage of the results of the execution of the instruction. Therefore, the suffix instruction becomes a part of the prior instruction and is not independently executed within the processor.

Additionally, embodiments of the invention allow the processing of instructions having associated suffix instructions. In an embodiment, a two-operand instruction and an associated suffix instruction is processed within a processor, such that the suffix instruction can designate a different designation register for the operation performed within the two-operand instruction. Moreover, in an embodiment, this suffix instruction is not executed within the critical timing path of the processor, thereby reducing the impact on the speed of the execution of this two-operand instruction. In other embodiments, other operand formats can incorporate such suffix instructions. For example, in another embodiment, a two-operand instruction that includes the address of an immediate value that is used in place of one of the two operands can incorporate a suffix instruction. Accordingly, embodiments of the invention generate a three-operand format instruction while maintaining a 16-bit instruction format.

Therefore, as will be described below, embodiments of the invention allow for operations provided by three operand instructions, while reducing the code density associated with such instructions. Moreover, embodiments of the invention allow for operations provided by three operand instructions, while increasing the code efficiency.

Figure 1:
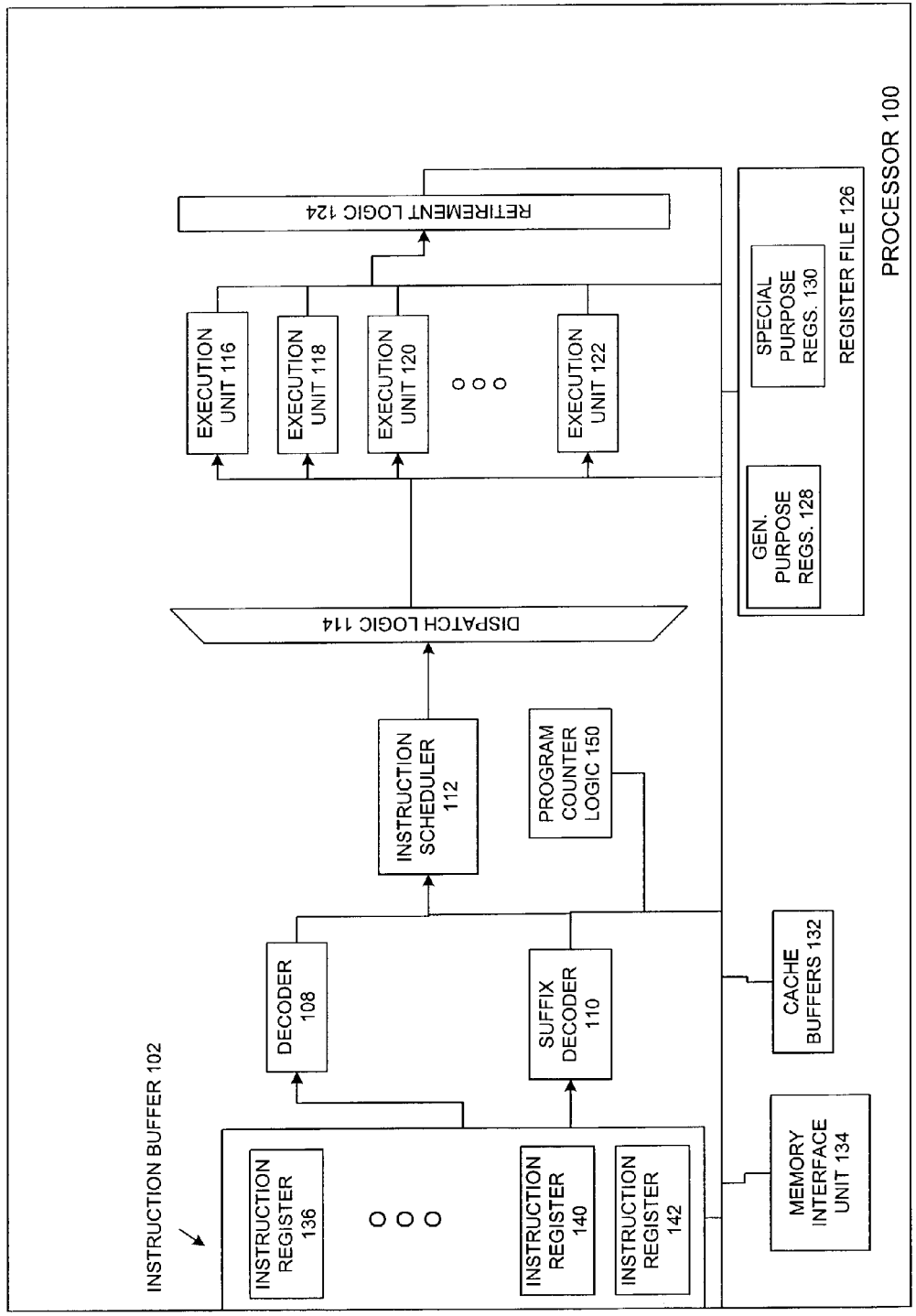
FIG. 1 illustrates a detailed diagram of a processor, according to one embodiment of the invention.
Figure 2:
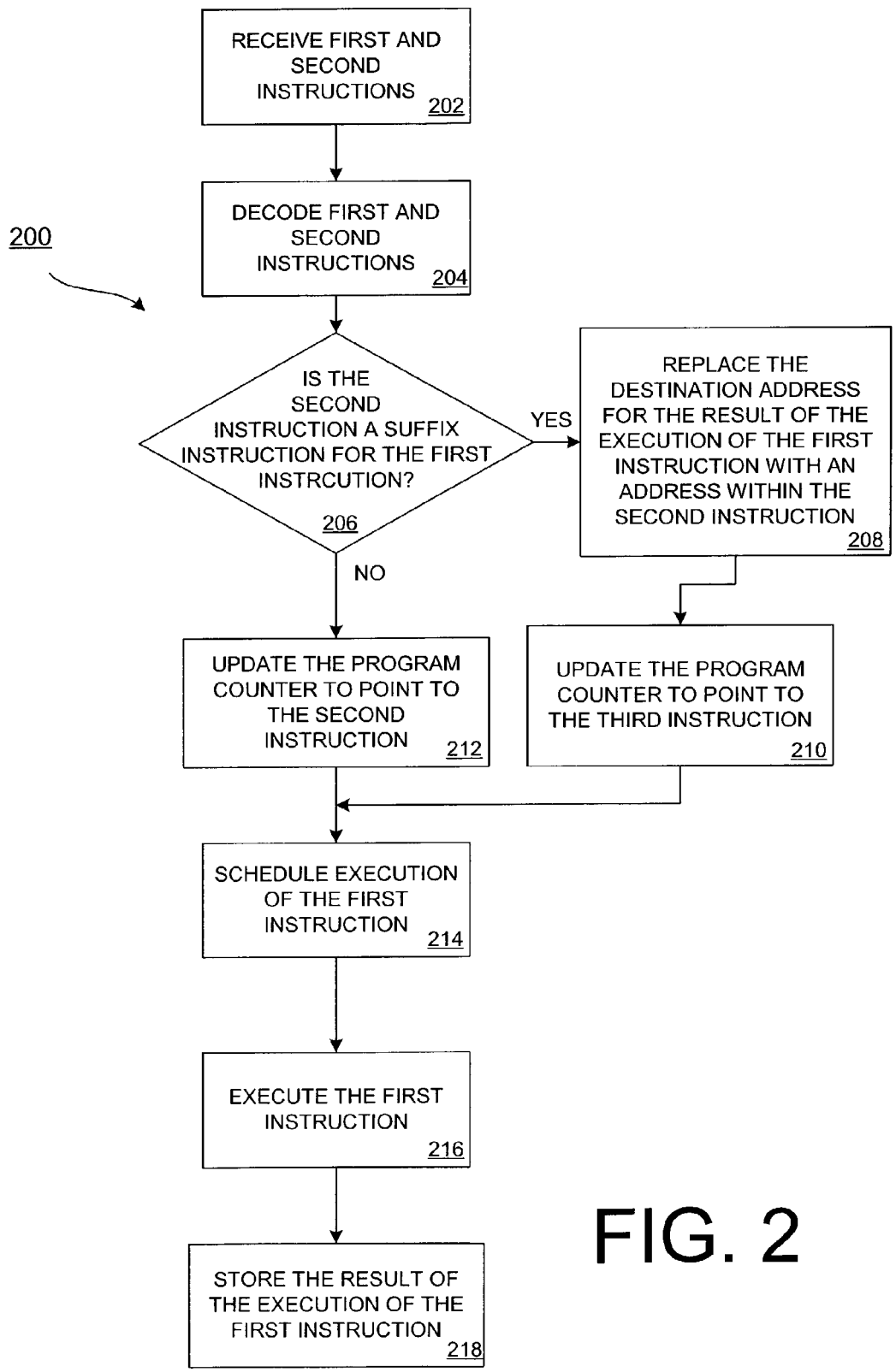
FIG. 2 is a flow diagram for processing instructions having associated suffix instructions, according to one embodiment of the invention.
Figure 3:
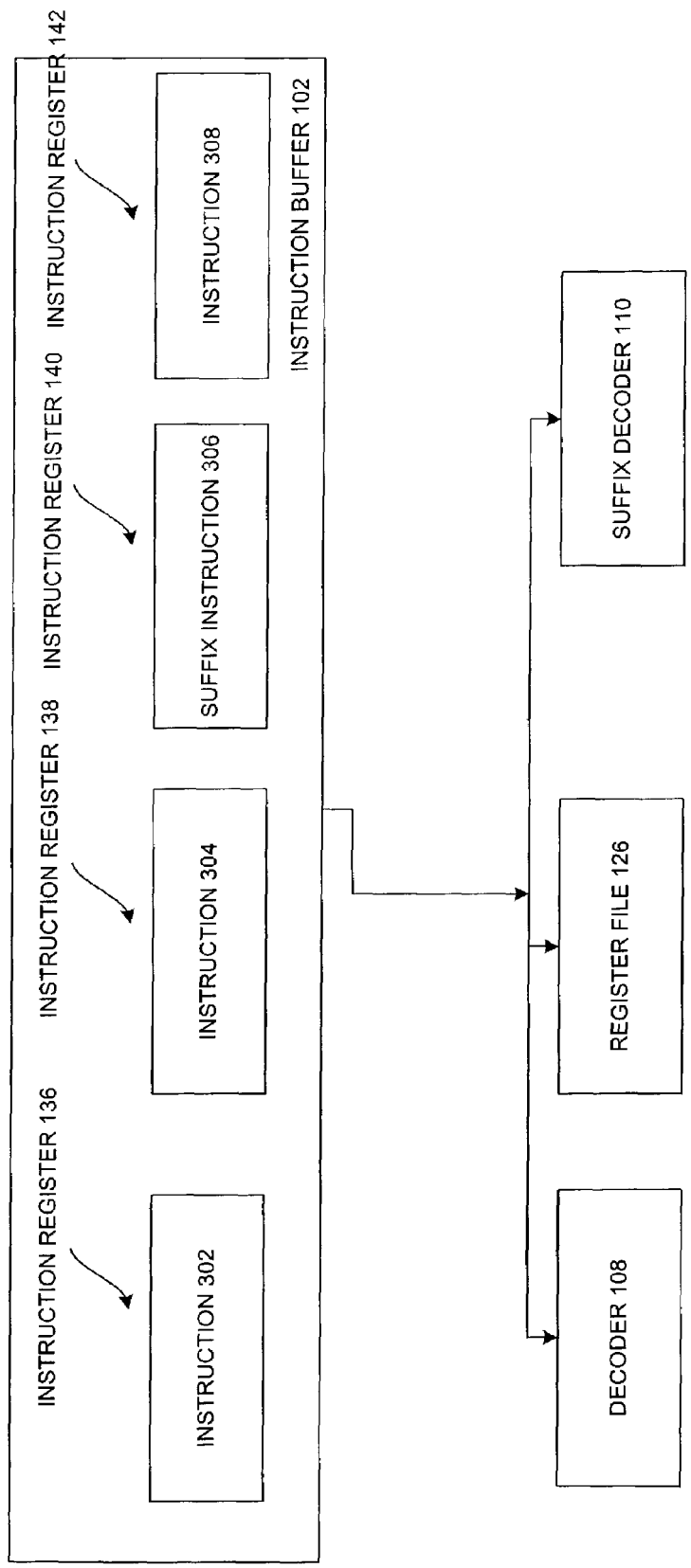
FIG. 3 shows a block diagram of instructions within instruction registers 136–142 being transferred to decoder 108, suffix decoder 110 and register file 126, according to one embodiment of the invention.

Moreover, FIGS. 1 and 3 illustrate a block diagram of a processor and data processed therein, in accordance with embodiments of the invention. FIG. 2 includes a flow diagram illustrating operations of a processor processing data, according to embodiments of the invention. The operations of the flow diagram will be described with references to the processor and data processed therein shown in the block diagrams. However, it should be understood that the operations of the flow diagram could be performed by embodiments of a processor and data other than those discussed with reference to the block diagrams, and embodiments discussed with reference to the processor and data processed therein could perform operations different than those discussed with reference to the flow diagrams.

FIG. 1 illustrates a detailed diagram of a processor, according to one embodiment of the invention. As shown, processor 100 of FIG. 1 comprises memory interface unit 134 coupled to cache buffers 132, register file 126 and instruction buffer 102. Register file 126 comprises general-purpose registers 128 and special purpose registers 130. In one embodiment, general-purpose registers 128 can include one to a number of registers. In an embodiment, special purpose registers 130 can include one to a number of registers. In an embodiment, one of the special purpose registers 130 includes a program counter register, which is described in more detail below. Instruction buffer 102 comprises instruction registers 136–142. In one embodiment, instruction buffer 102 can include one to a number of such registers for storing instructions for execution within processor 100.

As will be described in more detail below, memory interface unit 134 can retrieve macro instructions and associated operands and store such data into instruction buffer 102 and cache buffers 132, general purpose registers 128 and/or special purpose registers 130. Additionally, cache buffers 132, memory interface unit 134 and register file 126 are coupled to decoder 108, suffix decoder 110, program counter logic 150, execution units 116–122 and retirement logic 124. In an embodiment, program counter logic 150 updates a program counter stored in one of special purpose registers 130, which is described in more detail below.

Decoder 108 and suffix decoder 110 are coupled to instruction buffer 102, such that decoder 108 and suffix decoder 110 retrieve the instructions from instruction registers 136–142 within instruction buffer 102. Decoder 108 can receive and decode these instructions to determine the given instruction and also to generate a number of instructions in an internal instruction set. For example, in one embodiment, the instructions received by decoder 108 are termed macro instructions, while the instructions that are generated by decoder 108 are termed micro instructions (or micro-operations).

As will be described in more detail below, suffix decoder 110 can receive and decode these instructions to determine if a given instruction is a suffix to a prior instruction. In one embodiment, this suffix instruction includes a destination register for the results of the execution of the prior instruction. Decoder 108 and suffix decoder 110 are also coupled to instruction scheduler 112, such that instruction scheduler 112 can receive these micro-operations for scheduled execution by execution units 116–122.

Instruction scheduler 112 is coupled to dispatch logic 114, such that the instruction scheduler 112 transmits the instructions to be executed by execution units 116–122. Dispatch logic 114 is coupled to execution units 116–122 such that dispatch logic 114 transmits the instructions to execution units 116–122 for execution. Execution units 116–122 can be one of a number of different execution units, including, but not limited to, an integer arithmetic logic unit (ALU), a floating-point unit, memory load/store unit, etc. Execution units 116–122 are also coupled to retirement logic 124, such that execution units 116–122 execute the instructions and transmit the results to retirement logic 124. Retirement logic 124 can transmit these results to memory that can be internal or external to processor 100, such as registers within register file 126 or cache buffers 132, or memory external to processor 100 (not shown).

FIG. 2 is a flow diagram for processing instructions having associated suffix instructions, according to one embodiment of the invention. The operation of flow diagram 200 of FIG. 2 will be described with reference to the processor of FIG. 1.

In block 202, a first instruction and a second instruction are received. With reference to processor 100 in FIG. 1, decoder 108 receives the first instruction. In an embodiment, suffix decoder 110 receives the second instruction. In one embodiment, the receiving of the first instruction by decoder 108 is performed in conjunction with receiving of the second instruction by suffix decoder 110.

To help illustrate, FIG. 3 shows a block diagram of instructions within instruction registers 136–142 being transferred to decoder 108, suffix decoder 110 and register file 126, according to one embodiment of the invention. As shown within FIG. 3, instruction register 136 stores instruction 302; instruction register 138 stores instruction 304; instruction register 140 stores suffix instruction 306; and instruction register 142 stores instruction 308.

In an embodiment, instruction 302, instruction 304 and instruction 308 are instructions that each include an operational code and two operands. For example, such instructions could include an operational code for an add operation, while the two operands could be addresses of two general purpose registers 128 within register file 126. In one embodiment, suffix instruction 306 is an instruction that is a suffix to the instruction that preceded it in the order of processing within processor 100. In the example shown in FIG. 3, suffix instruction 306 is a suffix instruction to instruction 304. In an embodiment, the suffix instruction comprises an operational code indicating that this instruction is a suffix to a preceding instruction. In one embodiment, the suffix instruction comprises a destination address, such that this address is employed as the destination of the results of the execution of a preceding instruction.

In an embodiment, in operation a number of instructions are buffered into the different instruction registers within instruction buffer 102 in a given order for subsequent execution within processor 100. For example, a first instruction is stored in instruction register 136, a second instruction is stored in instruction register 138, a third instruction is stored in instruction register 140 and a fourth instruction is stored in instruction register 142. Accordingly, processor 100 will process the instructions in such an order. In an embodiment (as shown in FIG. 3), not every instruction will be followed by an associated suffix instruction.

Moreover, in one embodiment, decoder 108 and suffix decoder 110 retrieve instructions from the number of different instruction registers 136–142 in an order, while the associated operands are transmitted to register file 126 for retrieval of data in the registers therein. In an embodiment, suffix decoder 110 retrieves the instruction that follows the instruction currently being processed by decoder 108. For example, assume that the order of processing for instruction stored within instruction buffer 102 includes an instruction within instruction register 136, followed by an instruction within instruction register 138, followed by an instruction within instruction register 140 and followed by an instruction within instruction register 142. Therefore, if decoder 108 is decoding instruction 302 (from instruction register 136), suffix decoder 110 is decoding instruction 304 (from instruction register 138) during a same instruction cycle. After the first and second instructions are received, control continues at block 204.

Returning to FIG. 2, in block 204, the first and second instructions are decoded. With reference to FIG. 3, decoder 108 decodes the first instruction, while suffix decoder 110 decodes the second instruction. For example, decoder 108 receives and decodes instruction 302 (stored in instruction register 136), while suffix decoder 110 receives and decodes instruction 304 (stored in instruction register 138). In an embodiment, decoder 108 receives and decodes the operational code of the first instruction to generate one to a number of micro-operations. Additionally, the operands within the first instruction are transmitted to register file 126, wherein the data from the data registers identified by such operands are retrieved. Further, in an embodiment, suffix decoder 110 decodes the second instruction to determine if the operational code therein indicates that this instruction is a suffix instruction to the first instruction. Control continues at block 206.

In block 206, a decision is made on whether the second instruction is a suffix instruction for the first instruction. With reference to processor 100 in FIG. 1, suffix decoder 110 determines whether the second instruction is a suffix instruction for the first instruction. In one embodiment, the location where the operational code in an instruction is stored comprises a value that indicates that this instruction is a suffix instruction to the preceding instruction.

In block 208, if the second instruction is a suffix instruction for the first instruction, the destination address for the result of the execution of the first instruction is replaced with an address within the second instruction. With reference to processor 100 in FIG. 1, upon determining that the second instruction is a suffix instruction for the first instruction, suffix decoder 110 transmits this new destination address (stored in this second instruction) to decoder 108 along with an indication that the current destination address is to be replaced with this new address. For example, if the first instruction comprises two source operands wherein one of the two source operands is also employed as the destination operand (for storing the result of the execution of the instruction), decoder 108 would generate micro operations that instruct the execution unit 116–122 (that is executing the instruction) to store the result in the address provided within the second instruction.

However, embodiments of the invention are not limited to two-operand format instructions. To further illustrate, in an embodiment, the first instruction could include an operational code, two source operands along with an immediate value (that is substituted for one of the values of the two source operands). The suffix instruction can include a destination address that replaces the destination address of the result of the execution of the instruction. Control continues at block 210.

In block 210, the program counter is updated to point to the third instruction. In an embodiment, the program counter is one of special purpose registers 130. With reference to processor 100 in FIG. 1, program counter logic 150 updates the program counter for determining the next instruction to be executed. Because the second instruction is a suffix instruction to the first instruction, the second instruction is not considered an instruction to be independently executed within processor 100 and therefore not decoded by decoder 108. Rather, the decoding of the second instruction is considered complete in conjunction with the decoding of the first instruction. Accordingly, program counter logic 150 updates the program counter to point to the instruction register storing the instruction after the second instruction. Control continues at block 214 (which is described in more detail below).

In block 212, upon determining that the second instruction is not a suffix instruction for the first instruction, the program counter is updated to point to the second instruction. With reference to processor 100 in FIG. 1, program counter logic 150 updates the program counter to point to the second instruction. In particular, the second instruction is not a suffix instruction to the first instruction and is independently decoded by decoder 108. Accordingly, program counter logic 150 updates the program counter to point to the instruction register that stores the second instruction.

Returning to FIG. 3 to help illustrate, if decoder 108 decodes instruction 302 and suffix decoder 110 decodes instruction 304 in a first cycle, suffix decoder 110 would determine that instruction 304 is not a suffix instruction to instruction 302. Accordingly, program counter logic 150 would update the program counter to point to instruction register 138 (that is storing instruction 304). In the next cycle, decoder 108 would decode instruction 304, while suffix decoder 110 would decode suffix instruction 306. Because suffix instruction 306 is a suffix instruction to instruction 304, program counter logic 150 would update the program counter to point to instruction register 142, which is storing instruction 308 (bypassing the decoding of suffix instruction 306 by decoder 108). After updating the program counter to point to the second instruction, control continues at block 216.

In block 216, the first instruction is scheduled for execution. With reference to processor 100 in FIG. 1, decoder 108 transmits the generated micro operations (including the possible ones that include a new destination address for the result of the execution of the first instruction) to instruction scheduler 112. In an embodiment, instruction scheduler 112 schedules the first instruction for execution with one of the number of execution units 116–122.

In block 214, the first instruction is executed. With reference to processor 100 in FIG. 1, one to a number of execution units 116–122 execute the first instruction. For example, if the first instruction includes an integer add operation the execution unit 116–122 that comprises an integer arithmetic logic unit would execute at least a portion of the first instruction.

In block 216, the result of the execution of the first instruction is stored. With reference to processor 100 in FIG. 1, the results of the execution of the first instruction are transmitted to retirement logic 124. Retirement logic 124 transmits these results to the destination address provided by decoder 108. In an embodiment, this destination address is the address stored in the instruction that is a suffix to the current instruction (as is provided by suffix decoder 110 to decoder 108). In one embodiment, this destination address is the address stored in the current instruction. For example, in one such embodiment, the destination address is one of the addresses of the source operands.

Accordingly, embodiments of the invention allow the processing of instructions having associated suffix instructions. In particular, an instruction along with an associated suffix instruction is processed within a processor, such that the suffix instruction can affect the processing of the instruction. In an embodiment, the suffix instruction includes a different destination address for storage of the results of the execution of the instruction. Therefore, the suffix instruction becomes a part of the prior instruction and is not independently executed within the processor. Moreover, as described, embodiments of the invention reduce the impact on the speed of the execution of the instructions, because the suffix instruction is not executed within a critical timing path of the processor. In particular, the suffix instruction affects the destination address that is not critical during the instruction decode, as the destination address is not needed until completion of both the instruction decode and the schedule/execution of such instruction.

System Description

Figure 4:
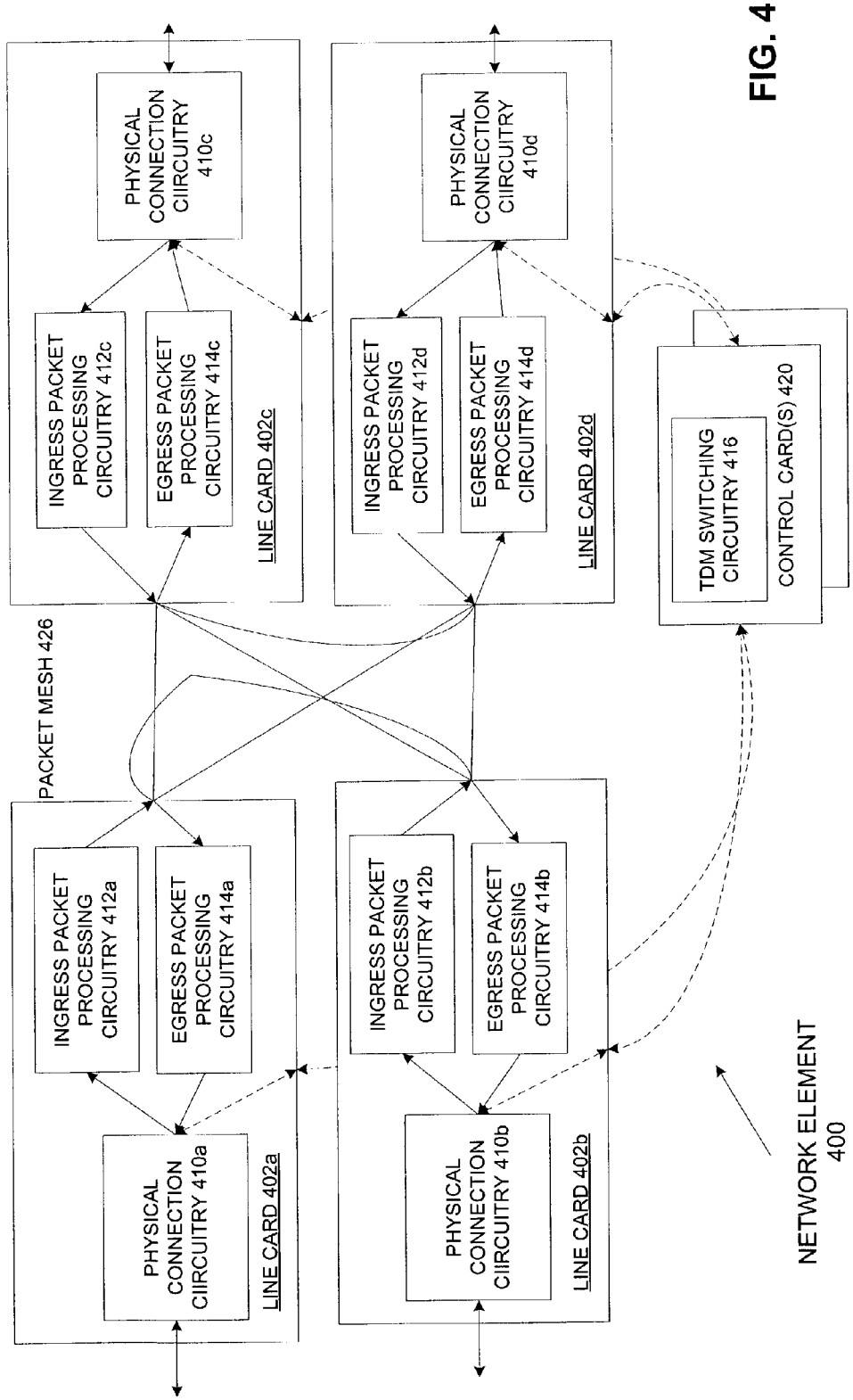
FIG. 4 illustrates a network element for processing instructions having associated suffix instructions, according to one embodiment of the invention.

FIG. 4 illustrates a network element for processing instructions having associated suffix instructions, according to one embodiment of the invention. As shown, network element 400 includes line cards 402*a*–*d* and control card(s) 420, such that control card(s) 420 are coupled to each of line cards 402*a*–*d*. The number of line cards illustrated are for the sake of simplicity and not by way of limitation, as a lesser or greater number of line cards can be included within network element 400. Additionally, network element 400 includes a first switch fabric, packet mesh 426, which includes a full mesh such that each of line cards 402*a*–*d* are coupled to one another. For example, line card 402*a* is coupled to line cards 402*b*–*d* through packet mesh 426. However, embodiments of the invention are not limited to a full mesh for the transmission of packets among line cards 402*a*–*d*, as any type of switching method that switches based on the addressing scheme described herein can be incorporated into embodiments of the invention. For example, in one embodiment, line cards 402*a*–*d* could be coupled together using a switch fabric, such that the line cards are coupled to a control card, which provides for the switching therein.

Line cards 402*a*–*d* include physical connection circuitry 410*a*–*d*, ingress packet processing circuitry 412*a*–*d* and egress packet processing 414*a*–*d*, respectively. Physical connection circuitry 410*a*–*d* can be coupled to lines external to network element 400, as shown, which can carry optical and/or electrical signals. In one embodiment, line cards 402*a*–*d* of network element 400 may be connected to an optical line transmitting SONET OC-N signals. Moreover, in an embodiment, line cards 402a–d of network element 400 may be connected to an electrical line such as a T1, T3, E1, E3, Ethernet, Gigabit Ethernet, etc. However, embodiments of the invention are not limited to the above-described examples, as any other type of optical or electrical data transmission can be incorporated into embodiments of the invention. Additionally, control cards(s) 420 include Time Division Multiplexing (TDM) switching circuitry 416.

In an embodiment, each line card 402a–d can be coupled to four optical and/or electrical lines. In another embodiment, each line card 402a–d can be coupled to eight optical and/or electrical lines. However, embodiments of the invention are not so limited, as a lesser or greater number of optical and/or electrical lines can be coupled to network element 400 through line cards 402a–d. Additionally, physical connection circuitry 410a–d are coupled to ingress packet processing circuitry 412a–d, respectively, such that packet data being received from the opticai and/or electrical lines is passed from physical connection circuitry 410a–d to ingress packet processing circuitry 412a–d, respectively. In one embodiment, the packet data is extracted from a TDM signal, which is described in more detail below.

Ingress packet processing circuitry 412a–d is coupled to packet mesh 426. Accordingly, each ingress packet processing circuitry 412a–d is coupled to each egress packet processing circuitry 414a–d, respectively, on other line cards 402a–d through packet mesh 426. Moreover, egress packet processing circuitry 414a–d is respectively coupled to physical connection circuitry 410a–d, such that packet data traffic coming in from packet mesh 226 from ingress packet processing circuitry 412a–d is transmitted from egress packet processing circuitry 414a–d to physical connection circuitry 410a–d, respectively. In one embodiment, ingress packet processing circuitry 412a–d and egress packet processing circuitry 414a–d include a processor that executes instructions having associated suffix instructions, as described herein. However, embodiments of the invention are not so limited, as other units within network element 400 can execute instructions having associated suffix instructions.

Line cards incorporated into embodiments of the invention are not limited to those illustrated by line cards 402a–d. Moreover, the network elements can have different line card configurations from that shown by line cards 402a–d. For example, a given in-ring network element could be limited to a single line card that can receive and transmit TDM traffic (which may include packet traffic) within various network configurations, employing multiple interfaces for the receipt and transmittal of TDM traffic. In another embodiment, a given network element can include a first line card to receive TDM traffic (which may include packet traffic) from another network element, while a second line card can transmit TDM traffic to another or same network element. In one such embodiment, a third line card can be incorporated into this given network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another network element, a second interface transmits TDM traffic to another network element and a third interface adds, drops and transmits traffic, such as packet traffic to a different network element.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer 2/3 traffic can be processed to extract the layer 2/3 traffic, with the layer 2/3 traffic going through the packet mesh to a line card connected to an in-ring network element, and then out onto the ring carried by a SONET frame; layer 2/3 traffic coming form an out-of-ring network element can go through the packet mesh to an line card connected to an out-of-ring network element, and then go out of the ring being carried by the protocol of the interface of that egress line card; etc.

With regard to the TDM traffic, a second switch fabric (in addition to packet mesh 426) is formed among line cards 402a–d and TDM switching circuitry 416 of control cards 420, as illustrated by the dashed lines in FIG. 4. In particular, physical connection circuitry 410a–d is coupled to TDM switching circuitry 416 for the receiving and transmitting of TDM traffic into and out of network element 400. Accordingly, TDM switching circuitry 416 receive TDM traffic from physical connection circuitry 410a–d and switches this traffic to any of physical connection circuitry 410a–d, based on configuration data for the timeslots of the TDM traffic. For example, TDM switching circuitry 416 could be configured such that data within the first ten timeslots of a TDM signal, such as a SONET/SDH signal, received on a first interface of physical connection circuitry 410a are forwarded out the first five timeslots of a TDM signal being transmitted out from a first interface of physical connection circuitry 410d.

Figure 5:
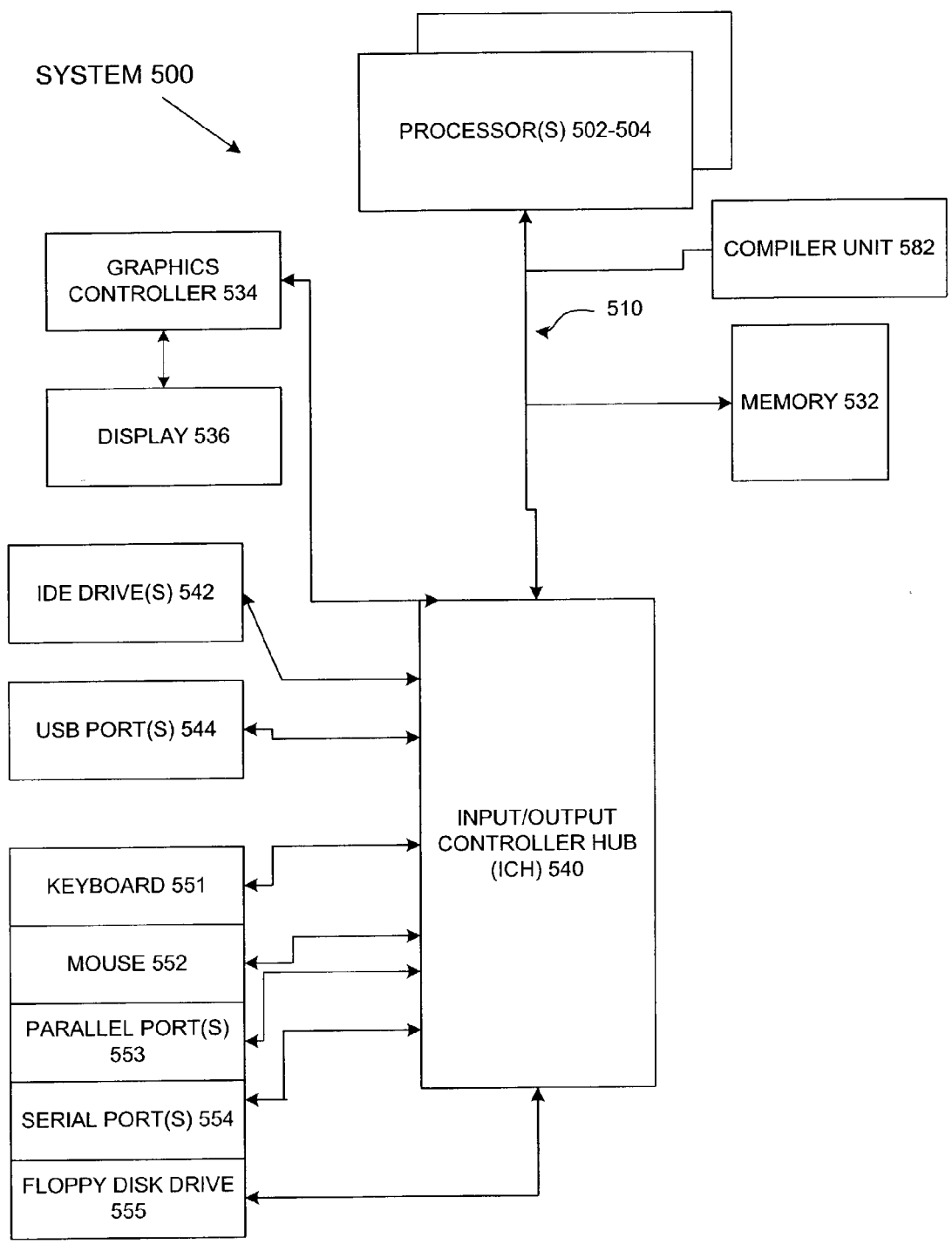
FIG. 5 illustrates a different system for processing instructions having associated suffix instructions, according to one embodiment of the invention.

FIG. 5 illustrates a different system for processing instructions having associated suffix instructions, according to one embodiment of the invention. Although described in the context of system 500, the present invention may be implemented in any suitable computer system comprising any suitable one or more integrated circuits.

As illustrated in FIG. 5, computer system 500 comprises processor 502 and processor 504. Computer system 500 also includes memory 532, processor bus 510 and input/output controller hub (ICH) 540. Computer system 500 for other embodiments may comprise one, three, or more processors any of which may execute a set of instructions that are in accordance with embodiments of the invention.

Memory 532 stores data and/or instructions, for example, for computer system 500 and may comprise any suitable memory, such as a dynamic random access memory (DRAM) for example. Graphics controller 534 controls the display of information on a suitable display 536, such as a cathode ray tube (CRT) or liquid crystal display (LCD), for example, coupled to graphics controller 534.

ICH 540 provides an interface to I/O devices or peripheral components for computer system 500. ICH 540 may comprise any suitable interface controllers to provide for any suitable communication link to processors 502/504, memory 532 and/or to any suitable device or component in communication with ICH 540. ICH 540 for one embodiment provides suitable arbitration and buffering for each interface.

For one embodiment, ICH 540 provides an interface to one or more suitable integrated drive electronics (IDE) drives 542, such as a hard disk drive (HDD) or compact disc read only memory (CD ROM) drive for example, to store data and/or instructions for example, one or more suitable universal serial bus (USB) devices through one or more USB ports 544. ICH 540 for one embodiment also provides an interface to a keyboard 551, a mouse 552, one or more suitable devices, such as a printer for example, through one or more parallel ports 553, one or more suitable devices through one or more serial ports 554, and a floppy disk drive 555. Additionally, computer system 500 includes compiler unit 582. In an embodiment, compiler unit 582 can be processes or tasks that can reside within main memory 532 and/or processors 502 and 504 and can be executed within processors 502 and 504. However, embodiments of the invention are not so limited, as compiler unit 582 can be different types of hardware (such as digital logic). In one embodiment, compiler unit 582 generates instructions having associated suffix instructions, as described herein.

In one such embodiment, the generation of the associated suffix instructions is included within an optimization phase of the compilation of the program code, thereby causing the generation of the instructions. For example, assume that after a first stage of the compilation of a program code, a first instruction is generated wherein a value stored in a source operand for this instruction is overwritten because this source operand is employed as the location of the result for the instruction. Moreover, assume that a subsequent instruction is also generated wherein this same value is employed. Therefore, an optimization within the optimization phase of the compilation could prevent this same value from being overwritten by the result of the execution of the first instruction by generating a suffix instruction for the first instruction. Accordingly, a different location is employed for the storage of the result of the execution of the first instruction, and therefore, this same value remains stored in one of the internal registers of the processor. This can increase the execution of the program code because a second retrieval of this same value would not be required.

Computer system 500 includes a machine-readable medium on which is stored a set of instructions (i.e., software) embodying any one, or all, of the methodologies described herein and/or are generated based on such methodologies. For example, software can reside, completely or at least partially, within memory 532 and/or within processors 502/504. Accordingly, in an embodiment, processors 102 and 104 can execute instructions having associated suffix instructions, as described herein.

For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

A method, apparatus and system for processing instructions having associated suffixes have been described. Although the present invention has been described with reference to specific exemplary embodiments, it will be evident that various modifications and changes may be made to these embodiments without departing from the broader spirit and scope of the invention. For example, embodiments of the invention are described such that one instruction can be a suffix instruction to a preceding instruction. Examples herein described a suffix instruction that included a different destination address for the result of the execution of the instruction of the preceding instruction. However, embodiments of the invention are not so limited. For example, in another embodiment, the suffix instruction could include a different source address that replaces one of the source operands in the preceding instruction. In an embodiment, the suffix instruction could include an immediate value that replaces one of the source operands in the preceding instruction. Accordingly, the specification and drawings are to be regarded in an illustrative rather than a restrictive sense.

What is claimed is:

1. A method comprising:
   receiving a first instruction and a second instruction, wherein the second instruction specifies that a destination address of the first instruction should be replaced with a destination address provided by the second instruction;
   decoding the first instruction and the second instruction, wherein the decoding comprises,
      replacing the destination address of the first instruction with the address provided by the second instruction, upon determining that the second instruction is a suffix instruction to the first instruction.

2. The method of claim 1, comprising updating a program counter for a program that includes the first instruction and the second instruction.

3. The method of claim 2, wherein the updating of the program counter comprises,
   incrementing the program counter to point to a third instruction upon determining that the second instruction is a suffix instruction to the first instruction; and
   incrementing the program counter to point to the second instruction upon determining that the second instruction is not a suffix instruction to the first instruction.

4. The method of claim 1, wherein the first instruction comprises a first operand and a second operand, wherein one of the first and second operands is a destination location for a result of executing the first instruction.

5. The method of claim 1, comprising,
   executing the first instruction; and
   storing the result of the executing of the first instruction into the destination address.

6. A method comprising:
   decoding a first instruction having a first operand and a second operand, wherein one of the first and second operands is a destination location for a result of executing the first instruction; and
   decoding a second instruction that specifies that the destination location of the first instruction should be replaced with a different destination location provided by the second instruction, wherein the decoding comprises determining whether the second instruction is a suffix to the first instruction;
   wherein the decoding of the first instruction comprises replacing the destination location of the first instruction with the different destination location stored in the second instruction upon determining that the second instruction is a suffix to the first instruction.

7. The method of claim 6, comprising,
executing the first instruction; and
storing the result of the executing of the first instruction into the different destination location.

8. The method of claim 6, comprising updating a program counter for a program that includes the first instruction and the second instruction.

9. The method of claim 8, wherein the updating of the program counter comprises,
incrementing the program counter to point to a third instruction upon determining that the second instruction is a suffix instruction to the first instruction; and
incrementing the program counter to point to the second instruction upon determining that the second instruction is not a suffix instruction to the first instruction.

10. An apparatus comprising:
a decoder coupled to an instruction buffer, the instruction buffer comprising a first instruction register and a second instruction register, wherein the first instruction register is to store a first instruction and the second instruction register to store a second instruction that specifies that a destination address of the first instruction should be replaced with a destination address provided by the second instruction, the decoder to decode the first instruction; and
a suffix decoder coupled to the instruction buffer, the suffix decoder to decode the second instruction, wherein the decoding by the suffix decoder includes replacing the destination address of the first instruction with an address stored in the second instruction, upon determining that the second instruction is a suffix instruction to the first instruction.

11. The apparatus of claim 10, comprising program counter logic coupled to a program counter register, the program counter register to store a program counter for a program that includes the first instruction and the second instruction.

12. The apparatus of claim 11, wherein the program counter logic is to increment the program counter to point to a third instruction upon determining that the second instruction is a suffix instruction to the first instruction.

13. The apparatus of claim 11, wherein the program counter logic is to increment the program counter to point to the second instruction upon determining that the second instruction is not a suffix instruction to the first instruction.

14. The apparatus of claim 10, wherein the first instruction comprises a first operand and a second operand, wherein one of the first and second operands is a destination location for a result of executing the first instruction.

15. A processor comprising:
an instruction buffer that includes a first instruction register and a second instruction register, the first instruction register to store a first instruction and the second register to store a second instruction, wherein the first instruction is to be executed prior to the second instruction, the first instruction to include a first and a second operand, wherein an address of one of the first and second operands is an address of a result of the execution of the first instruction, and wherein the second instruction specifies that the address of the result of the execution of the first instruction should be replaced with an address provided by the second instruction;
a decoder coupled to the instruction buffer, the decoder to decode the first instruction; a suffix decoder coupled to the instruction buffer, the suffix decoder to decode the second instruction, the decoding by the suffix decoder to include determining if the second instruction is a suffix instruction for the first instruction; and
a number of execution units coupled to the decoder and the suffix decoder, wherein one of the number of execution units is to execute the first instruction, wherein a result of the execution is placed in the address stored in the suffix instruction upon determining, by the suffix decoder, that the second instruction is a suffix instruction to the first instruction.

16. The processor of claim 15, comprising program counter logic coupled to a program counter register, the program counter register to store a program counter for a program that includes the first instruction and the second instruction.

17. The processor of claim 16, wherein the program counter logic is to increment the program counter to point to a third instruction upon determining that the second instruction is a suffix instruction to the first instruction.

18. The processor of claim 16, wherein the program counter logic is to increment the program counter to point to the second instruction upon determining that the second instruction is not a suffix instruction to the first instruction.

19. The processor of claim 15, wherein the first instruction comprises a fist operand and a second operand, wherein one of the first and second operands is a destination location for a result of executing the first instruction.

20. A network element comprising:
a number of line cards, wherein the number of line cards comprise,
a packet processing circuitry coupled to receive a number of packets, the packet processing circuitry to route the number of packets based on a number of instructions, wherein the packet processing circuitry comprises,
a decoder coupled to an instruction buffer, the instruction buffer comprising a first instruction register and a second instruction register, wherein the first instruction register is to store a first instruction of the number of instructions and the second instruction register to store a second instruction of the number of instructions, the second instruction to specify that a destination address of the first instruction should be replaced with a destination address provided by the second instruction, the decoder to decode the first instruction; and
a suffix decoder coupled to the instruction buffer, the suffix decoder to decode the second instruction, wherein the decoding by the suffix decoder includes replacing a destination address of the first instruction with an address stored in the second instruction, upon determining that the second instruction is a suffix instruction to the first instruction.

21. The network element of claim 20, comprising program counter logic coupled to a program counter register, the program counter register to store a program counter for a program that includes the first instruction and the second instruction.

22. The network element of claim 21, wherein the program counter logic is to increment the program counter to point to a third instruction upon determining that the second instruction is a suffix instruction to the first instruction.

23. The network element of claim 21, wherein the program counter logic is to increment the program counter to point to the second instruction upon determining that the second instruction is not a suffix instruction to the first instruction.

24. The network element of claim 20, wherein the first instruction comprises a first operand and a second operand, wherein one of the first and second operands is a destination location for a result of executing the first instruction.

25. A machine-readable medium having program code for execution by a processor, the machine-readable medium comprising:
 a first instruction comprising an operational code, a first operand and a second operand, wherein one of the first operand and second operand is a destination location for a result of the execution by the processor of the first instruction; and
 a second instruction, wherein the second instruction is a suffix instruction to the first instruction, the suffix instruction specifying that the destination location of the first instruction should be replaced with a different destination location provided by the second instruction.

26. The machine-readable medium of claim 25, wherein a decoder within the processor replaces the destination location for the result of the execution of the first instruction with the new destination location in the second instruction, upon determining that the second instruction is a suffix instruction to the first instruction.

27. The machine-readable medium of claim 25, wherein a program counter is incremented to point to a third instruction during execution of the first instruction by the processor, upon determining that the second instruction is a suffix instruction to the first instruction.

* * * * *